(12) United States Patent
Lewis

(10) Patent No.: US 10,696,226 B2
(45) Date of Patent: Jun. 30, 2020

(54) VEHICLES AND METHODS FOR DISPLAYING OBJECTS LOCATED BEYOND A HEADLIGHT ILLUMINATION LINE

(71) Applicant: Toyota Research Institute, Inc., Los Altos, CA (US)

(72) Inventor: Thor Lewis, Sunnyvale, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 180 days.

(21) Appl. No.: 15/855,402

(22) Filed: Dec. 27, 2017

(65) Prior Publication Data
US 2019/0193632 A1    Jun. 27, 2019

(51) Int. Cl.
| G06K 9/00 | (2006.01) |
| B60R 1/00 | (2006.01) |
| B60Q 1/04 | (2006.01) |
| G06T 7/521 | (2017.01) |

(52) U.S. Cl.
CPC .................. *B60R 1/00* (2013.01); *B60Q 1/04* (2013.01); *G06K 9/00201* (2013.01); *G06K 9/00805* (2013.01); *G06T 7/521* (2017.01); *B60R 2300/106* (2013.01); *B60R 2300/205* (2013.01); *B60R 2300/301* (2013.01); *B60R 2300/308* (2013.01); *B60R 2300/8053* (2013.01);
(Continued)

(58) Field of Classification Search
CPC ............... B60R 1/00; B60R 2300/106; B60R 2300/301; B60R 2300/8093; B60R 2300/308; B60R 2300/205; B60R 2300/8053; B60Q 1/04; G06K 9/00201; G06K 9/00805; G06T 7/521; G06T 2207/30261
See application file for complete search history.

(56) References Cited

U.S. PATENT DOCUMENTS

| 5,414,439 A | 5/1995 | Groves et al. |
| 9,162,622 B2 | 10/2015 | Szczerba et al. |
| 9,588,340 B2 | 3/2017 | Hing et al. |
(Continued)

FOREIGN PATENT DOCUMENTS

KR    20150055181 A    5/2015

OTHER PUBLICATIONS

"Drivinga BMW with Night Vision Proves Illuminating Previewing Technologies that Make the Dark Less Scary", https://www.consumerreports.org/cro/news/2014/10/driving-a-bmw-with-night-vision-proves-illuminating/index.htm Accessed: Oct. 20, 2014.

*Primary Examiner* — Carol Wang
(74) *Attorney, Agent, or Firm* — Dinsmore & Shohl LLP

(57) ABSTRACT

Vehicles and methods for providing visual assistance to a driver during low ambient light conditions are provided. The vehicle includes at least one headlight, a visible light detection system configured to output a vision signal, a heads-up display configured to generate one or more images, one or more processors, and one or more non-transitory memory modules communicatively coupled to the one or more processors. The vision signal is indicative of an area illuminated by visible light generated by the at least one headlight. The memory modules store machine-readable instructions that, when executed, cause the one or more processors to receive an object signal representing a three-dimensional representation of an environment located in front of the vehicle.

20 Claims, 4 Drawing Sheets

(52) U.S. Cl.
CPC ............... *B60R 2300/8093* (2013.01); *G06T 2207/30261* (2013.01)

(56) References Cited

U.S. PATENT DOCUMENTS

| | | | |
|---|---|---|---|
| 2005/0074221 A1* | 4/2005 | Remillard | B60R 1/00 385/147 |
| 2007/0005609 A1 | 1/2007 | Breed | |
| 2007/0153086 A1* | 7/2007 | Usui | H04N 5/235 348/153 |
| 2010/0091301 A1* | 4/2010 | Masuda | G01B 11/2545 356/601 |
| 2013/0257274 A1* | 10/2013 | Sekiguchi | B60Q 1/143 315/82 |
| 2013/0314936 A1* | 11/2013 | Yamamura | F21S 41/19 362/516 |
| 2015/0116691 A1* | 4/2015 | Likholyot | G01S 17/89 356/4.01 |
| 2017/0282798 A1* | 10/2017 | Saito | B60Q 1/04 |
| 2018/0137375 A1* | 5/2018 | Takemura | B60R 21/00 |
| 2018/0259969 A1* | 9/2018 | Frazzoli | B60W 10/20 |

\* cited by examiner

VEHICLES AND METHODS FOR DISPLAYING OBJECTS LOCATED BEYOND A HEADLIGHT ILLUMINATION LINE

TECHNICAL FIELD

Embodiments described herein generally relate to vehicles and, more specifically, to a vehicle having an augmented reality system for projecting objects located beyond a headlight illumination line upon a heads-up display during low ambient light conditions.

BACKGROUND

A heads-up display projects an image onto an interior surface of a vehicle's windshield, and presents information to a driver. More specifically, the heads-up display generates virtual images that convey information pertaining to the operation of the vehicle such as speed, fuel level, directions, and the like. The vehicle information is conventionally displayed on the vehicle's instrument cluster or center console display. As a result, the driver needs to direct his or her gaze away from the road in order to view the vehicle information. In contrast, the heads-up display presents the vehicle information to the driver without the need to divert his or her attention away from the road. Some heads-up displays may also offer night vision capabilities that display various objects located in front of the vehicle during low ambient light conditions (e.g., dusk or at night). However, some limitations still exist with conventional heads-up displays, including those with night vision.

Furthermore, drivers often face many challenges driving at low ambient light conditions without the assistance of night vision. For example, the vehicle's headlights are only capable of projecting light at a limited distance. Thus, the driver may not be able to view any objects in the surrounding environment that are not illuminated by the headlights.

SUMMARY

In one embodiment, a vehicle includes at least one headlight, a visible light detection system configured to output a vision signal, a heads-up display configured to generate one or more images, one or more processors, and one or more non-transitory memory modules communicatively coupled to the one or more processors. The vision signal is indicative of an area illuminated by visible light generated by the headlights. The memory modules store machine-readable instructions that, when executed, cause the one or more processors to receive an object signal representing a three-dimensional representation of an environment located in front of the vehicle. In response to receiving the object signal, the processors are caused to determine the three-dimensional representation of the environment based on the object signal. The processors are also caused to compare the vision signal with the object signal to determine a line of illumination within the environment.

In another embodiment, a vehicle includes at least one mounted on an exterior of the vehicle, a visible light detection system configured to output a vision signal, a heads-up display configured to generate one or more images, one or more processors, and one or more non-transitory memory modules communicatively coupled to the processors. The vision signal is indicative of an area illuminated by visible light generated by the at least one headlight. The processors store machine-readable instructions that, when executed, cause the one or more processors to when executed, cause the one or more processors to receive an object signal representing a three-dimensional representation of an environment located in front of the vehicle. In response to receiving the object signal, the processors are caused to determine the three-dimensional representation of the environment based on the object signal. The processors are also caused to compare the vision signal with the object signal to determine a line of illumination within the environment. The processors are further caused to receive as a location of the vehicle, a speed of the vehicle, and time. The processors are also caused to combine the vision signal, the object signal, the latitude and longitude coordinates, the speed of the vehicle, and the time based on sensor fusion. The processors are caused to determine at least one unilluminated object that is located beyond the line of illumination based on the sensor fusion. Finally, the processors are caused to generate the at least one unilluminated object by the heads-up display.

In yet another embodiment, a method includes receiving an object signal representing a three-dimensional representation of an environment located in front of a vehicle. The method further includes receiving a vision signal indicative of an area illuminated by visible light generated by at least one headlight. In response to receiving the object signal, the method includes determining, by the one or more processors, the three-dimensional representation of the environment based on the object signal. The method includes comparing the vision signal with the object signal to determine a line of illumination within the environment.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
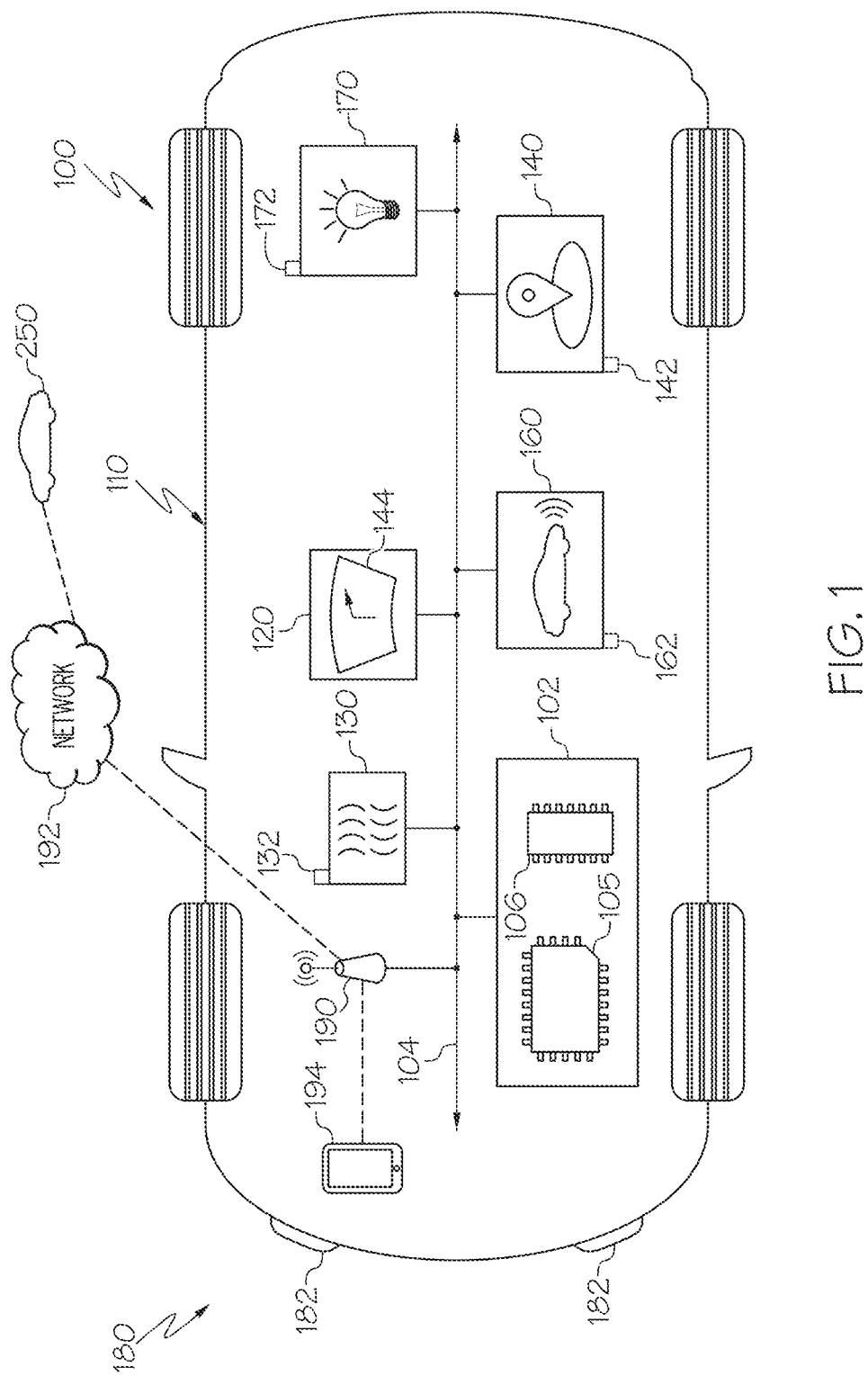
FIG. 1 depicts a schematic view of an example vehicle having a heads-up display configured to generate images of objects that are not illuminated by the vehicle's headlights, according to one or more embodiments shown and described herein.

The embodiments disclosed herein are directed to vehicles and methods for displaying objects located beyond a line of illumination created by the vehicle's headlights using a heads-up display. More specifically, the heads-up display allows for a driver to view one or more objects that may not normally be visible during low ambient light conditions such as at dusk, night, or at dawn based on augmented reality.

The disclosed vehicle includes headlights for providing illumination in low ambient light condition. The heads-up display is configured to generate images upon a windshield of the vehicle, where the images represent objects located in an environment in front of the vehicle that are not illuminated by the headlights. In one embodiment, the vehicle system may first determine that the headlights are activated. In response to determining the headlights of the vehicle are activated, the vehicle system determines a three-dimensional representation of the environment located in front of the vehicle based on an object signal. In one non-limiting embodiment, the object signal is generated by a three-dimensional object detection system of the vehicle.

The vehicle system may determine a portion of the environment illuminated by the headlights based at least in part by a vision signal and the object signal. The vision signal indicates an area within the environment in front of the vehicle illuminated by visible light generated by the headlights. The vehicle system then compares the portion of the environment illuminated by the headlights with the entire environment located in front of the vehicle to determine a line of illumination. The vehicle system may then generate the line of illumination by a heads-up display.

In one embodiment of the present disclosure, the vehicle system may further determine at least one unilluminated object that is located beyond the line of illumination based on at least the vision signal, the object signal, a geographical location of the vehicle, a GPS signal, a signal received from another vehicle, time, speed of the vehicle, and the like. The heads-up display then generates the unilluminated object upon the windshield for the driver to view. Accordingly, a driver of the vehicle is now able to view the unilluminated object during low ambient light conditions. In one embodiment, the heads-up display may only show a selected group of objects that are not illuminated by the headlights. More specifically, the driver may indicate that he or she only wishes to view roads signs and vehicles that are outside of the line of illumination. Therefore, the heads-up display will not generate images located outside of the line of illumination such as markings on the road, animals, or pedestrians since these objects were not selected by the driver.

In still another embodiment of the present disclosure, the vehicle system may also remove the unilluminated object from the heads-up display in response to determining the unilluminated object is located within the line of illumination. In other words, the unilluminated object is removed from the display once the object is illuminated by the vehicle's headlights. In still another embodiment, the objects displayed by the heads-up display may vary in contrast based on their position relative to the headlights of the vehicle. More specifically, objects located closer to the headlights are shown as a relatively light shade of gray, and objects located further away from the headlights are shown in darker shades of gray.

Various embodiments of vehicles and methods for generating objects located beyond a headlight illumination line upon the heads-up display during low ambient light conditions are disclosed below.

Referring now to FIG. 1, an example vehicle 100 is schematically depicted. The vehicle 100 may be any passenger vehicle such as, for example, a terrestrial, aquatic, and/or airborne vehicle. The vehicle 100 includes a communication path 104, an electronic control unit 102, a heads-up display 120, a three-dimensional object detection system 130, a location determination system 140, a vehicle operating condition sensor system 160, a visible light detection system 170, a headlight system 180, and network interface hardware 190. The headlight system 180 includes at one headlight 182 mounted to an exterior 110 of the vehicle 100. Each headlight 182 may include a light source, a reflector, and a lens mounted on an exterior the vehicle 100. The headlights 182 illuminate roadways as the driver operates the vehicle 100, and are used during low ambient light conditions such as, dusk or at night. The electronic control unit 102 includes one or more processors 105 and one or more memory modules 106.

As explained in greater detail below, the vehicle 100 employs augmented reality to display one or more objects upon a windshield 144 of the vehicle 100. The objects are not normally visible to the driver during low ambient light conditions, even when the headlights 182 are turned on or activated. More specifically, the disclosed system first receives an object signal indicative of the presence and spatial location of one or more objects located in front of the vehicle 100. The electronic control unit 102 may then determine a portion of the environment illuminated by the headlights 182 based on a vision signal generated by the visible light detection system 170 and the object signal. Specifically, the electronic control unit 102 compares the portion of the environment illuminated by the headlights 182 with the entire environment located in front of the vehicle 100, and determines a line of illumination 202 (visible in FIG. 2). The line of illumination 202 is generated by the heads-up display 120, and represents a separation between a portion of the environment illuminated by the headlights 182 of the vehicle 100, and a remaining portion of the environment that is not illuminated by the headlights 182 of the vehicle 100.

In one embodiment of the present disclosure, the electronic control unit 102 may determine at least one unilluminated object positioned in a location beyond the line of illumination 202. The heads-up display 120 may then generate the unilluminated object upon the windshield 144 for the driver to view. Furthermore, in response to the unilluminated object entering an area within the line of illumination 202, the vehicle system may then remove the object from view upon the heads-up display 120. In other words, once the driver is capable of viewing the object by the light generated by the headlights 182, then the heads-up display 120 removes the object from view.

Continuing to refer to FIG. 1, the communication path 104 provides data interconnectivity between various modules disposed within the vehicle 100. Specifically, each of the modules may operate as a node that may send and/or receive data. In some embodiments, the communication path 104 includes a conductive material that permits the transmission of electrical data signals to processors, memories, sensors, and actuators throughout the vehicle 100. In some embodiments, the communication path 104 can be a bus, such as, for example, a LIN bus, a CAN bus, a VAN bus, and the like. In some embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. Moreover, the communication path 104 may be formed from a combination of mediums capable of transmitting signals. In some embodiments, the communication path 104 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Still referring to FIG. 1, the electronic control unit 102 may be any computing device. For instance the electronic control unit 102 may be any type of vehicle-installed, handheld, desktop, or other form of single computing device, or may be composed of multiple computing devices. The electronic control unit 102 includes one or more processors 105 for controlling operations of the electronic control unit 102. The one or more processors 105 may include any device capable of executing machine-readable instructions stored on a non-transitory computer-readable medium. Accordingly, each of the one or more processors 105 may include a controller, an integrated circuit, a microchip, a computer, and/or any other computing device.

The electronic control unit 102 further includes one or more memory modules 106 communicatively coupled to the one or more processors 105. The one or more memory modules 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the electronic control unit 102 and/or external to the electronic control unit 102. The one or more memory modules 106 may be configured to store one or more pieces of logic as described in more detail below. The embodiments described herein may utilize a distributed computing arrangement to perform any portion of the logic described herein.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor, assembly language, object-oriented programming (OOP), scripting languages, microcode, etc., that may be compiled or assembled into machine-readable instructions and stored on a machine-readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. Logic stored on the one or more memory modules 106 may include, for example, object recognition logic, speech recognition logic, risk determination logic, notification generation logic, and autonomous vehicle control logic. Thus, the electronic control unit 102 includes logic to determine the line of illumination 202, determine at least one object located outside of the line of illumination 202, and generates the object by the heads-up display 120.

As noted above, the logic stored on the one or more memory modules 106 may include object recognition logic. The object recognition logic may include any known or yet-to-be-developed object recognition algorithms that may be utilized to detect objects within an environment. Example object recognition algorithms include, but are not limited to, edge detection algorithms, corner detection algorithms, blob detection algorithms, and feature description algorithms (e.g., scale-invariant feature transform ("SIFT"), speeded up robust features ("SURF"), gradient location and orientation histogram ("GLOH"), and the like. The logic stored on the electronic control unit may also include speech recognition logic used to detect the words spoken by the driver and/or passengers within the vehicle 100. Any known or yet-to-be-developed speech recognition algorithms may be used for the speech recognition logic.

In the embodiments described herein, the one or more memory modules 106 and the one or more processors 105 are integral with the electronic control unit 102. However, it is noted that the electronic control unit 102, the one or more memory modules 106, and the one or more processors 105 may be discrete components communicatively coupled to one another without departing from the scope of the present disclosure. As an example and not a limitation, one or more processors and one or more memory modules 106 of the electronic control unit 102 may be remote to the vehicle 100. For example, the vehicle 100 may be in wireless communication (e.g., using a wireless communication system) with a remote server storing logic and data that is configured to perform at least some of the functionalities described herein.

The heads-up display 120 is communicatively coupled to the electronic control unit 102 over the communication path 104. The heads-up display is configured to display semi-transparent or partially opaque visual indicia upon the windshield 144 of the vehicle 100. The visual indicia may be in the form of a two dimensional or a three-dimensional object. In one embodiment, the heads-up display 120 may include a projector for displaying images upon the windshield 144 of the vehicle 100, where the images are controlled to follow the driver's vision. In an alternate embodiment, the projector may be replaced by a special windshield having an integrated display screen or a transparent imaging system affixed to the windshield 144.

Figure 2:
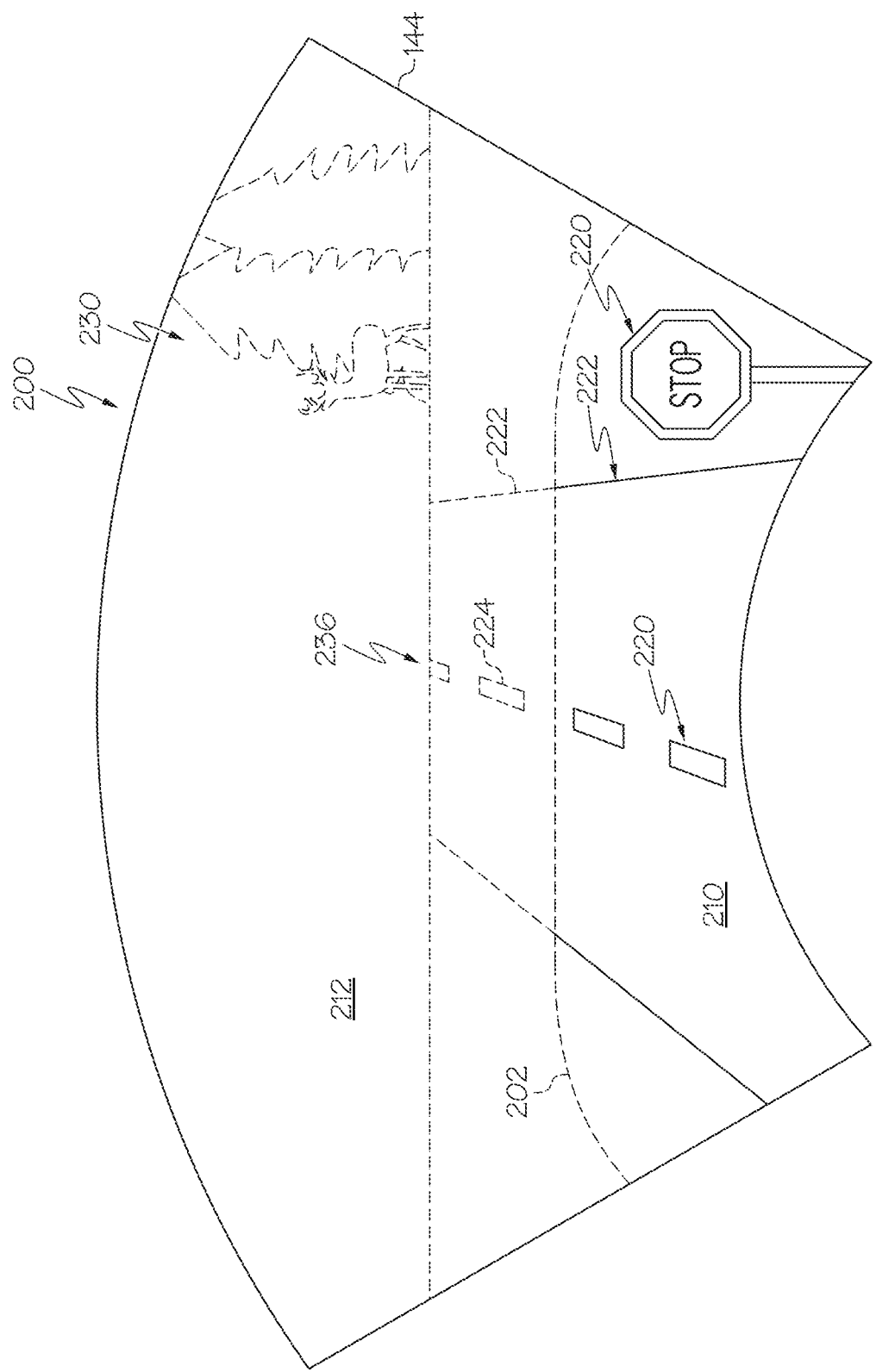
FIG. 2 depicts a schematic view of an example heads-up display that generates an image including at least one object not illuminated by the headlights, according to one or more embodiments shown and described herein.

Referring now to FIG. 2, an exemplary embodiment of an image 200 displayed upon the windshield 144 by the heads-up display 120 is depicted. The image 200 represents the environment in front of the vehicle 100 that is illuminated by the headlights 182 (FIG. 1). The line of illumination 202 represents a border that divides a portion of the environment 210 illuminated by the headlights 182 with the remaining portion of the environment 212 that is not illuminated by the headlights 182. As explained in greater detail below, the image 200 includes objects situated not only inside of the line of illumination 202, but outside of the line of illumination 202 as well.

Turing back to FIG. 1, the three-dimensional object detection system 130 is communicatively coupled to the electronic control unit 102 over the communication path 104. The three-dimensional object detection system 130 may include any device configured to detect a presence and a spatial location of an object located in the environment in front of the vehicle 100. More specifically, the three-dimensional object detection system 130 is configured to detect the x-axis, y-axis, and z-axis coordinates for objects. The three-dimensional object detection system 130 may include an object detection sensor 132 configured to output the object signal indicative of the presence and spatial location of one or more objects located in front of the vehicle 100. The object detection sensor 132 may include, but is not limited to, a LiDAR sensor, a stereo vision system including two night vision cameras, and the like. In some embodiments, the three-dimensional object detection system 130 includes more than one object detection sensor 132. More specifically, as seen in FIG. 2, the object signal is indicative of the objects and their corresponding spatial location in the environment 210 illuminated by the headlights 182 as well as the remaining portion of the environment 212 not illuminated by the headlights 182.

Referring to FIG. 1, based on the object signal of the object detection sensor 132, the electronic control unit 102 may execute object recognition logic to detect an object, a three-dimensional location of the object, and classify the detected object into a classification. The object detection sensor 132 may include, but is not limited to, a LiDAR sensor, a stereo vision system including two night vision cameras, and the like. In some embodiments, the three-dimensional object detection system 130 includes more than one object detection sensor 132. The object may be, for example, another vehicle, a pedestrian, an animal, signs or symbols, and the like. For example, at low ambient light conditions nocturnal animals may be situated on the road or within the vicinity of the vehicle 100. However, the animals may not be visible to the driver unless the animal is directly illuminated by the headlights 182 of the vehicle 100.

As explained below, in one embodiment the electronic control unit 102 may also detect objects in the remaining portion of the environment 212 not illuminated by the headlights 182 (FIG. 2) based on a GPS signal, or based on data determined by another external vehicle 250. That is, the object signal may be generated by another vehicle instead of the three-dimensional object detection system 130. For example, data extracted from the GPS signal may indicate objects in the distance beyond the line of illumination 202. In addition or alternatively, objects may be detected by the electronic control unit 102 based on other sources too, such as the cameras of other vehicles. In still another approach, the object signal may be based at least in part based on map data.

The location determination system 140 is communicatively coupled to the electronic control unit 102 over the communication path 104. The location determination system 140 may include any device configured to determine a location of the vehicle 100. For example, the location determination system 140 may determine that the vehicle 100 is on a highway, in a city, in a rural area, etc. As such, the location determination system 140 may include a location sensor 142 configured to output a location signal indicative of the location of the vehicle 100. Based on the location signal of the location determination system 140, the electronic control unit 102 may execute logic to determine a vehicle location. The location sensor 142 may include, but is not limited to, a camera, a GPS unit, and the like. In embodiments where the location sensor 142 includes a camera, the electronic control unit 102 may execute object recognition logic to determine based on objects within the environment of the vehicle 100, the location of the vehicle 100. For example, the one or more processors 105 of the electronic control unit 102 may execute object recognition logic, such that the electronic control unit 102 may read signs and/or recognize objects that may indicate a location of the vehicle 100 (e.g., on ramps, highways, sidewalks, storefronts, houses, and the like).

The vehicle operating condition sensor system 160 is communicatively coupled to the electronic control unit 102 over the communication path 104. The vehicle operating condition sensor system 160 may include any device configured to detect one or more operating conditions of the vehicle 100. For example, the vehicle operating condition sensor system 160 may detect vehicle speed, acceleration, braking, position of the steering wheel, and the like. As such, the vehicle operating condition sensor system 160 may include an operation condition sensor 162 configured to output an operational signal indicative of one or more operation of the vehicle 100. The operation condition sensor 162 may include, but is not limited to, a speed sensor, an acceleration sensor, a braking sensor, a steering angle sensor, and the like. In some embodiments, the operation condition sensor 162 may be a GPS unit, wherein a speed of the vehicle 100 is determined from an output of the GPS unit.

Referring to FIG. 1, the visible light detection system 170 is communicatively coupled to the electronic control unit 102 over the communication path 104. The visible light detection system 170 may include any optical device configured to detect light of the visible spectrum, and record the visible light as a series of images or video. For example, the visible light detection system 170 may include one or more video cameras capable of recording moving images. More specifically, the visible light detection system 170 is configured to monitor the environment in front of the vehicle 100 that is illuminated by the headlights 182, and outputs the vision signal. Referring now to both FIGS. 1 and 2, the vision signal is indicative of the environment 210 that is illuminated by the visible light generated by the headlights 182. The visible light detection system 170 monitors the environment directly in front of the vehicle 100, and records images indicating the objects that are illuminated by the headlights 182. However, in some embodiments the visible light detection system 170 may not record images. The area illuminated by the visible light is representative of a beam pattern associated with the headlights 182.

The network interface hardware 190 is communicatively coupled to the electronic control unit 102 over the communication path 104. The network interface hardware 190 may be any device configured to at least receive data via a network 192. The network interface hardware 190 may also be able to transmit data via the network 192 as well. Accordingly, network interface hardware 190 may include a wireless communication module configured as a communication transceiver for sending and/or receiving any wired or wireless communication. For example, the network interface hardware 190 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 190 includes hardware configured to operate in accordance with the Bluetooth wireless communication protocol. In another embodiment, network interface hardware 190 may include a Bluetooth send/receive module for sending and receiving Bluetooth communications to/from a portable electronic device 194.

Referring to both FIGS. 1 and 2, the image 200 displayed upon the windshield 144 by the heads-up display 120 depicts the line of illumination 202, the portion of the environment 210 illuminated by the headlights 182, and the remaining portion of the environment 212 not illuminated by the headlights 182. One or more objects 220 located within the environment 210 are visible based on the visible light generated by the headlights 182. For example, in the embodiment as shown the objects 220 illuminated by the headlights 182 include a portion of a road 222, several dashed lines 224 of the road 222, and a stop sign.

The image 200 displayed upon the windshield 144 also depicts one or more objects 230 within the environment 212 that would not normally be visible to the driver of the vehicle 100. That is, the objects 230 are located outside of the line of illumination 202, and are not illuminated by the headlights 182. The objects 230 are illustrated using a dashed or phantom line. For example, in the non-limiting embodiment as shown in FIG. 2 the objects 230 include a portion of the road 222, several dashed lines 224 of the road 222, an animal (e.g., a deer), and several trees.

Continuing to refer to FIGS. 1 and 2, the electronic control unit 102 receives as input an activation signal indicating if the headlights 182 have been turned on and are generating visible light. In one embodiment, the electronic control unit 102 may also receive one or more signals indicating the ambient light conditions as well. More specifically, the ambient light sensor may be a photoelectric cell mounted on a dash of the vehicle 100, just behind the windshield 144. The electronic control unit 102 may also receive the object signal, which may be generated by the three-dimensional object detection system 130. Alternatively, in another embodiment the object signal may be generated by another external vehicle 250 having a three-dimensional object detection system. More specifically, the three-dimensional object detection system of the external vehicle 250 may generate the object signal. The external vehicle 250 is in communication with the vehicle 100 by the network 192. The object signal is included with data generated by the external vehicle 250 that is sent over the network 192 and received by the electronic control unit 102 via the network interface hardware 190.

In response to determining the headlights 182 of the vehicle 100 are activated and receiving the object signal, the electronic control unit 102 determines a three-dimensional representation of the environment located directly in front of the vehicle 100 based on the object signal. The electronic control unit 102 then determines the portion of the environment 210 illuminated by the headlights 182 based on the vision signal and the object signal. More specifically, the electronic control unit 102 compares the portion of the environment 210 illuminated by the headlights 182 with the entire environment (from the object signal) to determine the line of illumination 202. In one embodiment, the electronic control unit 102 may then generate the line of illumination 202 upon the heads-up display 120.

The electronic control unit 102 also determines the objects 230 located outside of the line of illumination 202, and generates the objects 230 upon the windshield 144 by the heads-up display 120. In other words, the electronic control unit 102 determines the objects 230 not illuminated by the headlights 182, and then the heads-up display 120 generates the objects 230 for the driver to view. Specifically, the electronic control unit 102 determines one or more objects 230 based on factors such as, but not limited to, the three-dimensional representation of the environment, the environment 210 illuminated by the headlights 182, the illumination line 202, GPS data indicating the geographical location of the vehicle 100 (i.e., latitude and longitude coordinates indicating the location of the vehicle 100), the speed of the vehicle 100, time, and the like. More specifically, the factors may be combined based on sensor fusion to determine the objects 230. Sensor fusion involves combining or fusing data derived from disparate sources to determine an output, where in the present disclosure the output would be the objects 230. The electronic control unit 102 then generates the unilluminated objects 230 for display by the heads-up display 120. For example, in the embodiment as shown in FIG. 2, the unilluminated objects 230 generated by the heads-up display 120 include a portion of the road 222, several dashed lines 224 of the road 222, the deer, and several trees. The unilluminated objects 230 may be represented as life-like representations or in another approach as icons. In addition to or alternatively, descriptive words may be used to identify the object 230 (e.g., the word "deer" would be displayed under the deer in FIG. 2, or the deer would be omitted and only the text would be shown).

In one embodiment, the electronic control unit 102 may continue to monitor the factors (e.g., the three-dimensional representation of the environment, the environment 210 illuminated by the headlights 182, the illumination line 202, GPS data, the speed, time, and the like), and determine when the objects 230 that are unilluminated fall within the line of illumination 202 based on sensor fusion. In other words, the electronic control unit 102 determines when the objects 230 are illuminated by the headlights 182 as the vehicle 100 travels along the road 222. In response to determining the objects 230 are illuminated, the objects 230 are removed from view on the heads-up display 120.

In another embodiment, the electronic control unit 102 may vary the contrast of the objects 230 based on the position of the objects 230 relative to the line of illumination 202. In other words, the objects 230 displayed by the heads-up display 120 vary in contrast based on their position relative to the headlights 182 of the vehicle 100, where objects 230 that are brighter and closer to the headlights 182 are shown as a relatively light shade of gray, and objects 230 located further away from the headlights 182 are shown in darker shades of gray. More specifically, the shading of the objects 230 vary based on their level of illumination, where objects that are almost completely lit may be a very light shade of gray and objects that are not visible at all may be almost black. The objects 230 may fade progressively from black to white based on grayscale imaging. The objects 230 may start black, which is the total absence of transmitted or reflected light, and then gradually fades to a relatively light shade of gray. The object 230 may turn various intermediate shades of gray as the object 230 fades from black to a very light gray.

The electronic control unit 102 may first determine the distance between the object 230 and the vehicle 100 based on the object signal (which indicates the spatial location of the object 230) and the GPS signal (which indicates the latitude and longitude coordinates of the vehicle 100). The electronic control unit 102 may then assign a brightness level to the object 230 based on the distance between the object 230 and the vehicle 100. The electronic control unit 102 may then project an image by the heads-up display 120 representative of the object 230, where the object is displayed in grayscale based on the brightness level. Although grayscale is disclosed, it should be appreciated that the disclosure is not limited to generating objects using only this approach. Furthermore, the disclosure is not limited to the specific approach for determining the shading of the objects 230 as described.

A relatively short distance between the object 230 and the vehicle 100 may result in a relatively light gray image that is projected by the heads-up display 120, while a relatively long distance between the object 230 and the vehicle 100 may result in a relatively dark gray image projected by the heads-up display 120. In one non-limiting embodiment, if the heads-up display 120 employs 8-bit grayscale imaging, then 256 tonal options of gray may exist (since $2^8=256$).

More specifically, the tones of the grayscale images projected by the heads-up display 120 may range from 0 (black) to 255 (white). Furthermore, 254 shades of gray exist between the white and black colors.

In the embodiment as shown in FIG. 2, the portion of the road 222 in the environment 212 not illuminated by the headlights 182 and located directly adjacent to the line of illumination 202 would be a very light shade of gray that is almost white, while the objects 230 located furthest away from the line of illumination 202 (e.g., the deer and the trees) would be black or nearly black. In this way, a driver may be able to distinguish distances between the various objects 230. Furthermore, it should also be appreciated that the objects 230 may gradually fade in and out of view as they approach the line of illumination 202, rather than simply appearing and disappearing on the windshield 144.

Figure 3:
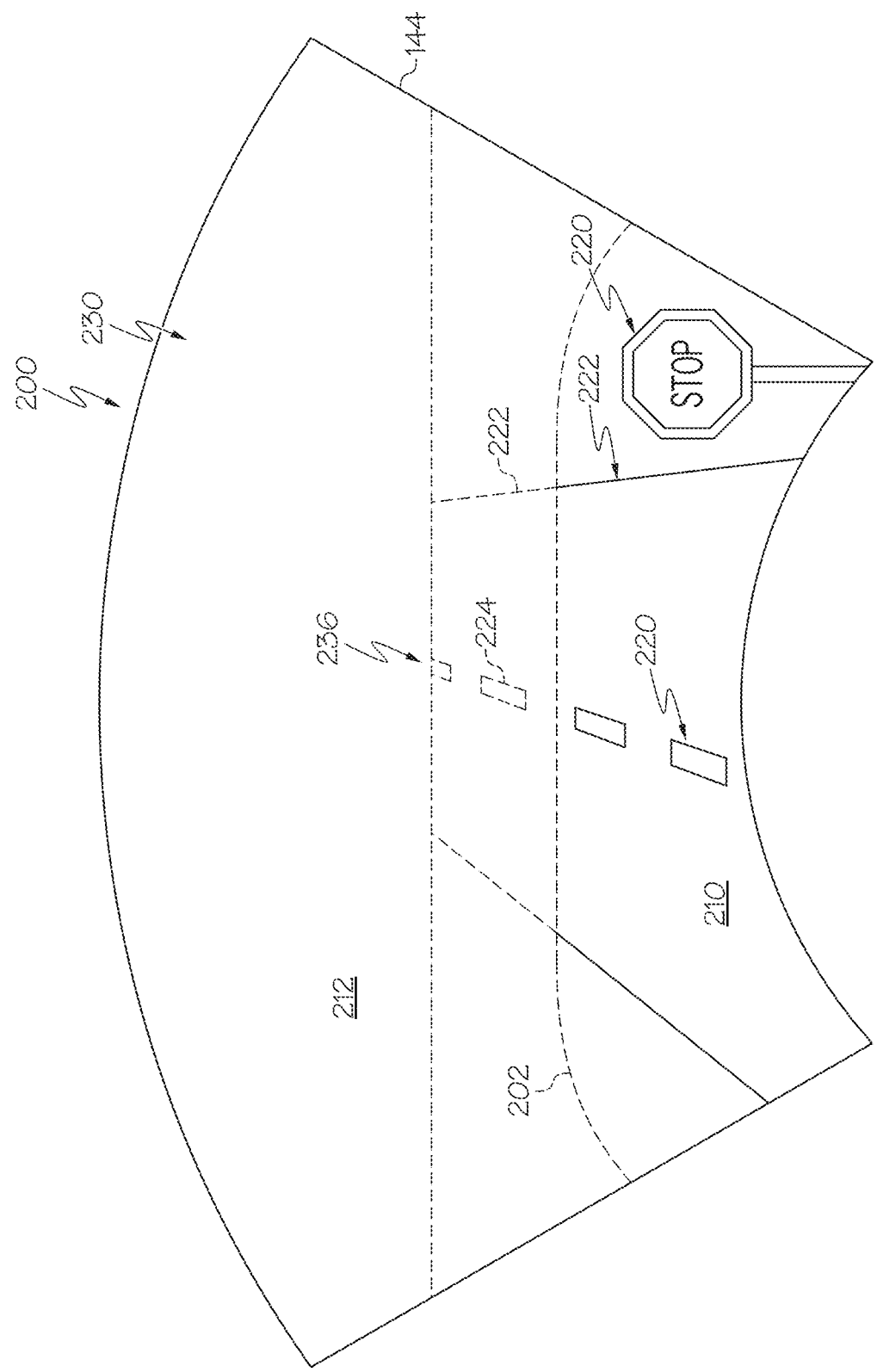
FIG. 3 depicts a schematic view of an example heads-up display shown in FIG. 2 where only a selected group of objects are displayed, according to one or more embodiments shown and described herein.

Turning now to FIG. 3, in still another embodiment of the disclosure the heads-up display 120 may only show a selected group of objects that are not illuminated by the headlights 182 (FIG. 1). More specifically, the selected group of objects is determined based on input from the driver. In one embodiment, the driver may indicate that he or she only wishes to view roads, vehicles, and road markings that are outside of the line of illumination 202. Therefore, as seen in FIG. 3 the heads-up display 120 does not generate the deer and the trees located on the environment 212 not illuminated by the headlights 182. Instead, the heads-up display 120 generates a portion of the road 222 and the lines 224.

Figure 4:
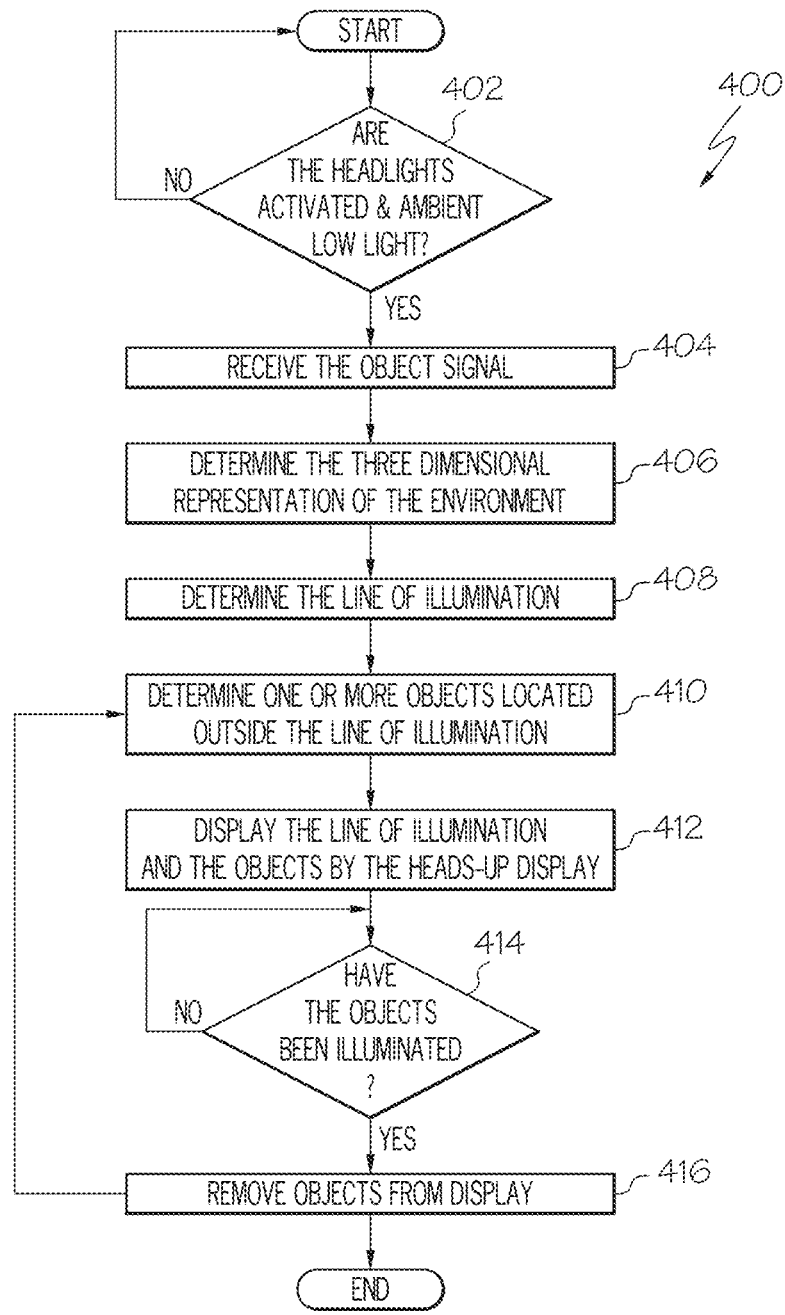
FIG. 4 depicts a flowchart of an example method for generating one or more objects upon the heads-up display of the vehicle shown in FIG. 1, according to one or more embodiments shown and described herein.

Referring now to FIG. 4, a flowchart 400 depicting a method for generating objects that are not visible to the driver of the vehicle 100 by the heads-up display 120 during low ambient light conditions. The method may be employed during low ambient light conditions such as, but not limited to, dusk, night, dawn, and the like. It should be understood that embodiments are not limited by the order of steps of the flowchart 400 of FIG. 4.

Referring to FIGS. 1 and 4, in decision block 402, the electronic control unit 102 monitors the communication path 104 for the activation signal indicating the headlights 182 are activated. The electronic control module 102 may also monitor an ambient light sensor to determine that the external light conditions (e.g., if it is dark outside). Once the electronic control unit 102 receives the activation signal and determines that low ambient light conditions exist, the method may then proceed to block 404.

In block 404, the electronic control unit 102 receives the object signal. As mentioned above, the object signal is indicative of the objects and their corresponding spatial location in the environment in front of the vehicle 100. The object signal may be generated by the three-dimensional object detection system 130, or alternatively by another vehicle in communication with the vehicle 100 by the network 192. The method may then proceed to block 406.

In block 406, the electronic control unit 102 may determine the three-dimensional representation of the environment in front of the vehicle 100 based on the object signal. The method may then proceed to block 408.

In block 408, the electronic control unit 102 may determine the line of illumination 202. More specifically, FIG. 2 illustrates the portion of the environment 210 illuminated by the headlights 182 as well as the remaining portion of the environment 212 not illuminated by the headlights 182. Referring to FIGS. 1, 2, and 4, the portion of the environment 210 illuminated by the headlights 182 may be determined based on the vision signal and the object signal. The electronic control unit 102 compares the portion of the environment 210 illuminated by the headlights 182 with the environment located in front of the vehicle 100 to determine the line of illumination 202. The method may then proceed to block 410.

In block 410, the electronic control unit 102 may determine one or more objects 230 located outside of the line of illumination 202. Specifically, the electronic control unit 102 determines one or more objects 230 based on factors such as, but not limited to, the three-dimensional representation of the environment, the environment 210 illuminated by the headlights 182, the illumination line 202, GPS data indicating the geographical location of the vehicle 100, the speed of the vehicle 100, time, and the like. The factors may be combined based on sensor fusion to determine the objects 230. The method may then proceed to block 412.

In block 412, in one embodiment the heads-up display 120 may generate the line of illumination 202 and the object 230 upon the windshield 144. Thus, the driver may now be able to see one or more objects that would normally not be visible while driving in low light conditions. The method may then proceed to decision block 414.

In decision block 414, the electronic control unit 102 may monitor the objects 230. In response to determining the objects 230 are illuminated by the headlights 182, the method may proceed to block 416.

In block 416, the objects 230 illuminated by the headlights 182 are removed from view on the heads-up display 120. The method may then proceed back to block 410, or alternatively the method may then terminate.

It should now be understood that embodiments described herein are directed to vehicle systems including a heads-up display that provides assistance to a driver during low ambient light conditions. More specifically, the heads-up display generates one or more objects upon the windshield, where the objects are located outside of the headlight's line of illumination. Thus, the objects displayed upon the windshield may not be visible by the driver within the assistance of the heads-up display. In one embodiment, the objects may gradually fade from black to white using grayscale imaging, where the intermediate shades of gray represent the object's distance from the vehicle. Once the objects are situated within the line of illumination of the headlights, then the heads-up display may remove the image. This is because the headlights now illuminate the object, and therefore no visual assistance is required.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A vehicle having at least one headlight, the vehicle comprising:
   a visible light detection system comprising a camera, the visible light detection system configured to output a vision signal, wherein the vision signal is indicative of an area illuminated by visible light generated by the at least one headlight;
   a heads-up display configured to generate one or more images;
   one or more processors; and
   one or more non-transitory memory modules communicatively coupled to the one or more processors and storing machine-readable instructions that, when executed, cause the one or more processors to perform at least the following:
receive an object signal representing a three-dimensional representation of an environment located in front of the vehicle;
in response to receiving the object signal, determine the three-dimensional representation of the environment based on the object signal;
compare the vision signal with the object signal to determine a line of illumination within the environment;
determine at least one unilluminated object by combining the vision signal, the object signal, a location of the vehicle, and a speed of the vehicle based on sensor fusion; and
generate a representation of the at least one unilluminated object by the heads-up display, wherein the at least one unilluminated object is located beyond the line of illumination.

2. The vehicle of claim 1, wherein the machine-readable instructions further cause the one or more processors to:
generate the line of illumination by the heads-up display; and
determine the at least one unilluminated object located beyond the line of illumination based on the sensor fusion; and
generate the representation of the at least one unilluminated object by the heads-up display.

3. The vehicle of claim 2, further comprising:
monitor the vision signal, the object signal, the location of the vehicle, the speed of the vehicle, and the time; and
determine that the at least one unilluminated object is located within the line of illumination based on the sensor fusion.

4. The vehicle of claim 3, wherein the machine-readable instructions further cause the one or more processors to:
remove the representation of the at least one unilluminated object from the heads-up display in response to determining the at least one unilluminated object is located within the line of illumination.

5. The vehicle of claim 2, wherein the machine-readable instructions further cause the one or more processors to:
determine a distance between the at least one unilluminated object and the vehicle based on the object signal and the location of the vehicle;
assign a brightness level to the at least one unilluminated object based on the distance between the at least one unilluminated object and the vehicle; and
project a grayscale image by the heads-up display representative of the at least one unilluminated object based on the brightness level.

6. The vehicle of claim 1, further comprising:
a three-dimensional object detection system comprising an object detection sensor configured to detect a presence and a spatial location of an object located in the environment in front of the vehicle, wherein the three-dimensional object detection system is configured to generate the object signal based on the presence and spatial location of the object.

7. The vehicle of claim 1, further comprising:
a network interface in communication with the one or more processors, wherein the network interface is configured to at least receive data via a network, and wherein the data received by the network interface includes the object signal.

8. The vehicle of claim 1, wherein the line of illumination represents a separation between a portion of the environment illuminated by the at least one headlight and a remaining portion of the environment that is not illuminated by the at least one headlight.

9. The vehicle of claim 1, wherein the area illuminated by the visible light generated by the at least one headlight is representative of a beam pattern associated with the at least one headlight.

10. A vehicle, comprising:
at least one headlight mounted on an exterior of the vehicle;
a visible light detection system comprising a camera, the visible light detection system configured to output a vision signal, wherein the vision signal is indicative of an area illuminated by visible light generated by the at least one headlight;
a heads-up display configured to generate one or more images;
one or more processors; and
one or more non-transitory memory modules communicatively coupled to the one or more processors and storing machine-readable instructions that, when executed, cause the one or more processors to perform at least the following:
receive an object signal representing a three-dimensional representation of an environment located in front of the vehicle;
in response to receiving the object signal, determine the three-dimensional representation of the environment based on the object signal;
compare the vision signal with the object signal to determine a line of illumination within the environment;
receive as input a location of the vehicle, a speed of the vehicle, and time;
combine the vision signal, the object signal, the location of the vehicle, the speed of the vehicle, and the time based on sensor fusion;
determine at least one unilluminated object that is located beyond the line of illumination based on the sensor fusion; and
generate a representation of the at least one unilluminated object by the heads-up display.

11. The vehicle of claim 10, further comprising:
monitor the vision signal, the object signal, the location of the vehicle, the speed of the vehicle, and the time; and
determine that the representation of the at least one unilluminated object is located within the line of illumination based on the sensor fusion.

12. The vehicle of claim 11, wherein the machine-readable instructions further cause the one or more processors to:
remove the representation of the at least one unilluminated object from the heads-up display in response to determining the at least one unilluminated object is located within the line of illumination.

13. The vehicle of claim 10, wherein the machine-readable instructions further cause the one or more processors to:
determine a distance between the at least one unilluminated object and the vehicle based on the object signal and the location of the vehicle;
assign a brightness level to the at least one unilluminated object based on the distance between the at least one unilluminated object and the vehicle; and
project a grayscale image by the heads-up display representative of the at least one unilluminated object based on the brightness level.

14. The vehicle of claim 10, further comprising:
a three-dimensional object detection system comprising an object detection sensor configured to detect a presence and a spatial location of an object located in the environment in front of the vehicle and generate the object signal based on the presence and spatial location of the object.

15. The vehicle of claim 10, further comprising:
a network interface in communication with the one or more processors, wherein the network interface is configured to at least receive data via a network, and wherein the data received by the network interface includes the object signal.

16. A method, comprising:
receiving an object signal representing a three-dimensional representation of an environment located in front of a vehicle;
receiving a vision signal indicative of an area illuminated by visible light generated by at least one headlight of the vehicle;
in response to receiving the object signal, determining, by one or more processors, the three-dimensional representation of the environment based on the object signal;
comparing the vision signal with the object signal to determine a line of illumination within the environment;
determining at least one unilluminated object by combining the vision signal, the object signal, a location of the vehicle, and a speed of the vehicle based on sensor fusion; and
generating a representation of the at least one unilluminated object by a heads-up display, wherein the at least one unilluminated object is located beyond the line of illumination.

17. The method of claim 16, wherein the method further comprises:
determining the at least one unilluminated object that is located beyond the line of illumination; and
generating the at least one unilluminated object by the heads-up display.

18. The method of claim 17, wherein the method further comprises:
monitoring the vision signal, the object signal, the location of the vehicle, the speed of the vehicle, and the time; and
determining the at least one unilluminated object is located within the line of illumination based on the sensor fusion.

19. The method of claim 18, wherein the method further comprises:
removing the at least one unilluminated object from the heads-up display in response to determining the at least one unilluminated object is located within the line of illumination.

20. The method of claim 17, wherein the method further comprises:
determining a distance between the at least one unilluminated object and the vehicle based on the object signal and the location of the vehicle;
assigning a brightness level to the at least one unilluminated object based on the distance between the at least one unilluminated object and the vehicle; and
projecting a grayscale image by the heads-up display representative of the at least one unilluminated object based on the brightness level.

\* \* \* \* \*